(12) United States Patent
Li et al.

(10) Patent No.: US 9,368,076 B2
(45) Date of Patent: Jun. 14, 2016

(54) LIQUID CRYSTAL DISPLAY FIXING FLICKER IN 3D IMAGE DISPLAY

(71) Applicant: SHENZHEN CHINA STAR OPTOELECTRONICS TECHNOLOGY CO., LTD., Shenzhen (CN)

(72) Inventors: Meng Li, Shenzhen (CN); JinJie Wang, Shenzhen (CN)

(73) Assignee: SHENZHEN CHINA STAR OPTOELECTRONICS TECHNOLOG CO., LTD, Shenzhen (CN)

(*) Notice: Subject to any disclaimer, the term of this patent is extended or adjusted under 35 U.S.C. 154(b) by 219 days.

(21) Appl. No.: 14/235,814

(22) PCT Filed: Jan. 6, 2014

(86) PCT No.: PCT/CN2014/070158
§ 371 (c)(1),
(2) Date: Jan. 29, 2014

(87) PCT Pub. No.: WO2015/100745
PCT Pub. Date: Jul. 9, 2015

(65) Prior Publication Data
US 2015/0325182 A1    Nov. 12, 2015

(30) Foreign Application Priority Data
Dec. 30, 2013 (CN) ............... 2013 1 0743210

(51) Int. Cl.
*G09G 3/36* (2006.01)
*G09G 3/00* (2006.01)
*G02F 1/133* (2006.01)
*H04N 13/04* (2006.01)

(52) U.S. Cl.
CPC .............. *G09G 3/3607* (2013.01); *G02F 1/133* (2013.01); *G09G 3/003* (2013.01); *G09G 3/3648* (2013.01); *G09G 3/3659* (2013.01); *G09G 2310/027* (2013.01); *G09G 2310/0297* (2013.01); *G09G 2320/0209* (2013.01); *G09G 2320/0247* (2013.01); *H04N 13/0454* (2013.01)

(58) Field of Classification Search
CPC . G09G 3/2074; G09G 3/3607; G09G 3/3614; G09G 3/3648; G09G 3/3659; G09G 3/3677; G09G 3/3688; G09G 3/364; G09G 2300/0426; G09G 2300/0443; G09G 2300/0804; G09G 2310/0248; G09G 2310/0297; G09G 2320/0247; G09G 3/003; G09G 2310/027; G09G 2320/0209; G02F 1/134336; G02F 1/136286; G02F 2001/134345; G02F 1/133; H04N 13/04; H04N 13/0452; H04N 13/0454; H04N 13/0456
See application file for complete search history.

(56) References Cited

U.S. PATENT DOCUMENTS

2004/0145581 A1* 7/2004 Morita ................ G09G 3/3677
                                                            345/204
2008/0136964 A1* 6/2008 Yamazaki ............ G09G 3/3648
                                                            348/450

(Continued)

*Primary Examiner* — Keith Crawley
(74) *Attorney, Agent, or Firm* — Mark M. Friedman

(57) ABSTRACT

The present invention proposes an LCD capable of reducing flicker when showing 3D images. The LCD adds a plurality of switch units to every row of scan lines while no additional gate driver is added. The plurality of switch units separately control charging and charge sharing of pixel units, therefore pixel charging and charge sharing are separately controlled. Hence the present invention fixes flicker in 3D image display while no additional gate driver is added.

9 Claims, 6 Drawing Sheets

(56) References Cited

U.S. PATENT DOCUMENTS

| | | | |
|---|---|---|---|
| 2010/0085292 A1* | 4/2010 | Chen | G09G 3/3688 345/92 |
| 2012/0154353 A1* | 6/2012 | Mochizuki | H01L 27/14663 345/207 |
| 2012/0206659 A1* | 8/2012 | Tsubata | G09G 3/3659 348/731 |
| 2013/0021334 A1* | 1/2013 | Lee | G09G 3/003 345/419 |
| 2013/0044090 A1* | 2/2013 | Wu | G02F 1/136213 345/204 |
| 2013/0100108 A1* | 4/2013 | Chiang | G09G 3/3659 345/212 |
| 2013/0128173 A1* | 5/2013 | Wu | G09G 5/00 349/43 |
| 2013/0257837 A1* | 10/2013 | Wang | G09G 3/3696 345/211 |
| 2013/0271357 A1* | 10/2013 | Wang | G09G 3/36 345/92 |
| 2013/0271504 A1* | 10/2013 | Kim | G09G 3/003 345/690 |
| 2014/0035968 A1* | 2/2014 | Chen | G09G 5/02 345/691 |
| 2014/0104148 A1* | 4/2014 | Wang | G09G 5/00 345/92 |
| 2014/0152640 A1* | 6/2014 | Chen | G09G 3/003 345/212 |
| 2015/0015821 A1* | 1/2015 | Lo | G02F 1/1368 349/43 |
| 2015/0194103 A1* | 7/2015 | Li | G09G 3/3607 345/691 |

\* cited by examiner

US 9,368,076 B2

LIQUID CRYSTAL DISPLAY FIXING FLICKER IN 3D IMAGE DISPLAY

BACKGROUND OF THE INVENTION

1. Field of the Invention

The present Invention relates to a 3D liquid crystal display (LCD), more particularly, to an LCD fixing flicker in 3D image display.

2. Description of Prior Art

Human feels images of the real world through what their eyes see. And human brains form the so-called 3-dimension (3D) images according to spatial difference between two different angles reflected in right and left eyes. The so-called 3D display device imitates prospect of two different angles of right and left human eyes, so that users feel like watching 3D images while 2D images are actually displayed.

Conventional LCD uses charge sharing to solve color shift. But to LCD switching from 2D to 3D modes, when 3D mode is initiated, charge sharing is ineffective due to frame inversion, resulting in flicker in 3D image.

More specifically, when LCD is under 3D mode, grey level position is actually a mixture of white and black, i.e. white and black images rotate as the first and the second frame alternatively, after mixture white and black reflect as grey in human eyes. Take frame inversion driving method as instance, every frame polarity inverses once. White image indicates a greater voltage drop with positive polarity, and black image indicates a greater voltage drop with negative polarity. If continuously displaying images like these, LCD is polarized resulting in residual image.

To fix residual image, a conventional method is change frequency of inversion from once every frame to once every two frames, which causes different luminance to right and left eyes due to high charging saturation of the second polar frame, and meanwhile leaves flicker unsolved.

To fix flicker, separately controlling pixel charging and charge sharing is feasible, i.e. besides scan lines a plurality of driving lines have to be set up to control charge sharing corresponding to every scan line, which doubles number of gate driver and increases production cost.

SUMMARY OF THE INVENTION

An object of the present invention is to provide an LCD fixing flicker in 3D image display to fix flicker in 3D image display while no additional gate driver is added.

According to the present invention, a liquid crystal display (LCD) fixing flicker in 3D image display comprises a scan line for sending a scan signal, a data line for sending a grey level signal, pixel units comprising a first sub-pixel and a second sub-pixel, a data controlling signal generator for generating a first data controlling signal and a second data controlling signal, a controlling signal generator for generating a first controlling signal, a second controlling signal, a third controlling signal and a fourth controlling signal, a charge sharing signal source for generating charge sharing signal, a first data switch electrically connected to the data line and the first sub-pixel, a second data switch electrically connected to the data line and the second sub-pixel, a first switch unit electrically connected to the scan line and the first sub-pixel, a second switch unit electrically connected to a constant voltage and the first sub-pixel, a third switch unit electrically connected to the scan line and the second sub-pixel, a fourth switch unit, electrically connected to the constant voltage and the second sub-pixel, and a charge sharing switch, electrically connected to the charge sharing signal source. The first data switch is used for conducting the grey level signal to the first sub-pixel when receiving the first data controlling signal. The second data switch is used for conducting the grey level signal to the second sub-pixel when receiving the second data controlling signal. The first switch unit is used for conducting the scan signal to the first sub-pixel when receiving the first controlling signal. The second switch unit is used for conducting the constant voltage to the first sub-pixel when receiving the second controlling signal. The third switch unit is used for conducting the scan signal to the second sub-pixel when receiving the third controlling signal. The fourth switch unit is used for conducting the constant voltage to the second sub-pixel when receiving the fourth controlling signal. The charge sharing switch is used for electrically connecting the first sub-pixel to the second sub-pixel when receiving the charge sharing signal and turning on.

In one aspect of the present invention, a process of the scan line sending the scan signal to the pixel units comprises a first period of time, a second period of time and a third period of time when the LCD is under 2D image mode. During the first period of time, the first data switch, the first switch unit and the fourth switch unit are turned off while the second data switch, the second switch unit, the third switch unit and the charge sharing switch are turned off, resulting in the first sub-pixel displaying grey level according to the grey level signal. During the second period of time, the second data switch, the second switch unit and the third switch unit are turned on while the first data switch, the first switch unit, the fourth switch unit and the charge sharing switch are turned off, resulting in the second sub-pixel displaying grey level according to the grey level signal. During the third period of time, the second switch unit, the fourth switch unit and the charge sharing switch are turned on while the first switch unit and the third switch unit are turned off, resulting in the first sub-pixel electrically connecting to the second sub-pixel.

In another aspect of the present invention, the first period of time, the second period of time and the third period of time are successive.

In another aspect of the present invention, the charge sharing signal is the scan signal. The controlling signal is also generating the fifth controlling signal and the sixth controlling signal. The LCD further comprises a fifth switch unit electrically connected to the scan line and the charge sharing switch, and a sixth switch unit electrically connected to the constant voltage. The fifth switch unit is used for conducting the scan signal to turn on the charge sharing switch when receiving the fifth controlling signal The sixth switch unit is used for conducting the constant voltage to turn off the charge sharing switch when receiving the sixth controlling signal.

In another aspect of the present invention, when the LCD is under 2D mode, the fifth switch unit is turned off while the sixth switch unit is turned on to conduct the constant voltage during the first and second periods of time; the fifth switch unit is turned on to conduct the scan signal while the sixth switch unit is turned off during the third period of time.

In another aspect of the present invention, when the LCD is under 2D mode, the first controlling signal and the second controlling signal are inversed, the third controlling signal and the fourth controlling signal are inversed, and the fifth controlling signal and the sixth controlling signal are inversed.

In another aspect of the present invention, when the LCD is under 3D mode, the fifth switch unit and the sixth switch unit are turned off.

In another aspect of the present invention, a process of the scan line sending the scan signal to the pixel units comprises a fourth period of time and a fifth period of time when the LCD is under 3D image mode. During the fourth period of time, the first switch unit and the fourth switch unit are turned on while the second switch unit and the third switch unit are turned off, resulting in the first sub-pixel displaying grey level according to the grey level signal. During the fifth period of time, the second switch unit and the third switch unit are turned on while the first switch unit and the fourth switch unit are turned off, resulting in the second sub-pixel displaying grey level according to the grey level signal.

In still another aspect of the present invention, the fourth period of time and the fifth period of time are successive.

In yet another aspect of the present invention, when the LCD is under 3D mode, the first controlling signal and the second controlling signal are inversed, the third controlling signal and the fourth controlling signal are inversed.

Compared to conventional art, the LCD in the present invention adds a plurality of switch units to every row of scan lines while no additional gate driver is added. The plurality of switch units separately control charging and charge sharing of pixel units, therefore pixel charging and charge sharing are separately controlled. Hence the present invention fixes flicker in 3D image display while no additional gate driver is added.

These and other features, aspects and advantages of the present disclosure will become understood with reference to the following description, appended claims and accompanying figures.

DETAILED DESCRIPTION OF THE PREFERRED EMBODIMENT

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
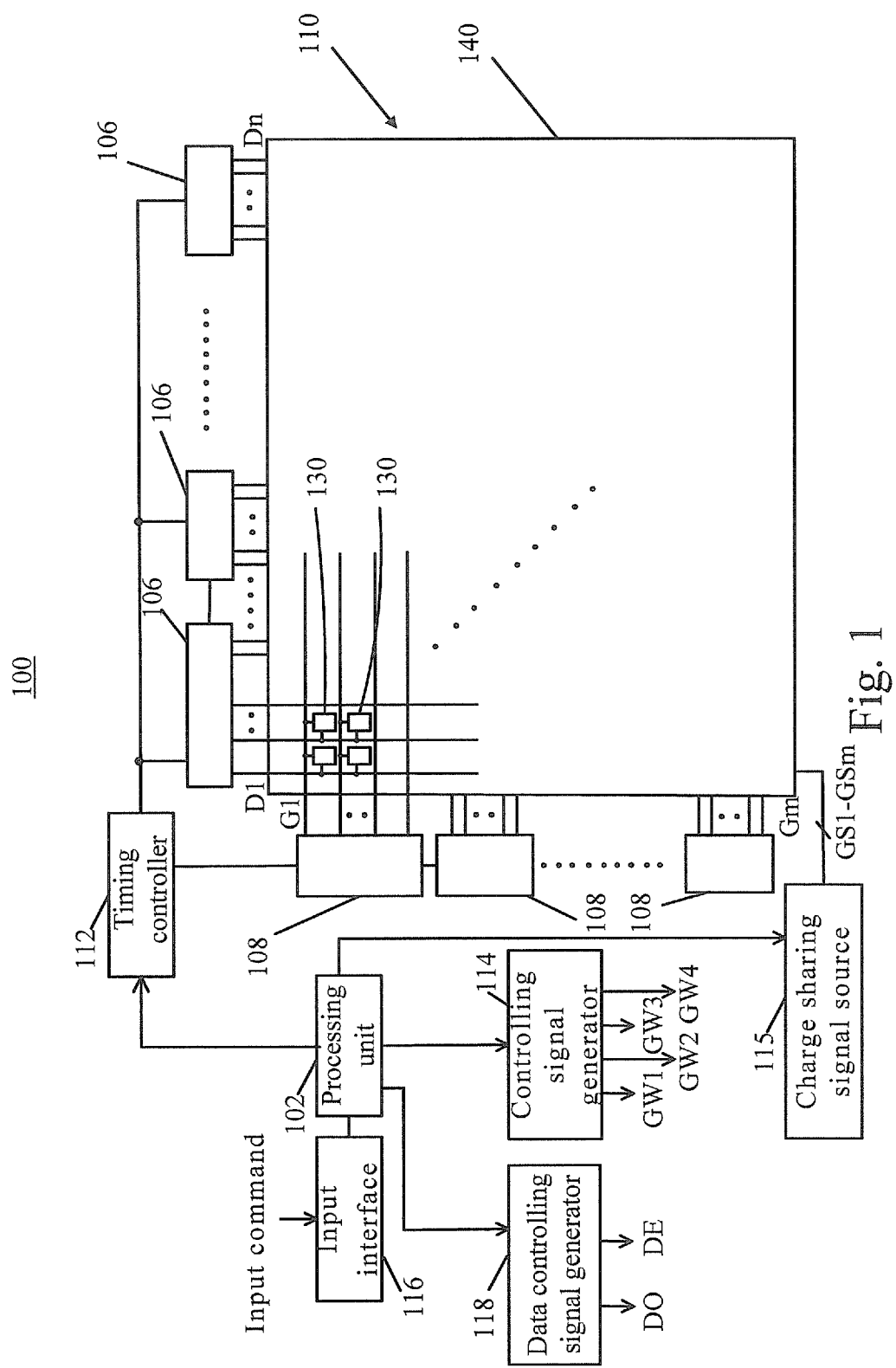
FIG. 1 illustrates a diagram of an LCD displaying 3D image according to a first embodiment of the present invention.

Please refer to FIG. 1, FIG. 1 illustrates a diagram of an LCD 100 displaying 3D image according to a first embodiment of the present invention. Users are able to switch 2D and 3D images while watching the LCD 100. The LCD 100 comprises a processing unit 102, a plurality of source drivers 106, a plurality of gate drivers 108, a timing controller 112, a controlling signal generator 114, an input interface 116, a data controlling signal generator 118, a charge sharing signal source 115 and an LCD panel 110. The LCD panel 110 comprises a plurality of pixel units 130 and a substrate 140.

The processing unit 102 is central processor of personal computers or laptops to generate signal of a plural frames of 2D and 3D images. The input interface 116 is input device users control, such as buttons set up on the LCD 100 or menu displayed on the LCD 100 which selects initiate signal of 2D/3D image according to users' input command. The processing unit 102 is electrically connected to the input interface 116 and outputs signal of a plural frames of 2D or 3D images to the timing controller 112. The controlling signal generator 114 is electrically connected to the processing unit 102 and generates different controlling signal GW1-GW4 according to initiate signal of 2D/3D images. The data controlling signal generator 118 is electrically connected to the processing unit 102 and generates different data controlling signal DO and DE according to initiate signal of 2D/3D image. The charge sharing signal source 115 generates different charge sharing signals GS1-GSm. Every row of the pixel units 130 is corresponded to charge sharing signals GS1-GSm respectively.

The timing controller 112 is electrically connected to the processing unit 102 and generate frequency pulse signal to the gate driver 108, and also converse received 2D or 3D image signal into 2D or 3D data signal. The gate driver 108 outputs scan signal according to frequency pulse signal, and the source driver 106 converse signal above into grey level signal of different charge level. The source driver 106 and the gate driver 108 are set up on a chip on film (COF) (non-illustrated) or a chip of glass (COG) 140, and electrically connected through the COF. The gate driver 108 sends scan signal to every row of pixel units 130 in sequence through scan lines G1~Gm. Every row of the pixel units 130 display different grey level according to grey level signal from the source driver 106 through data lines D1~Dn after receiving scan signal.

Figure 2:
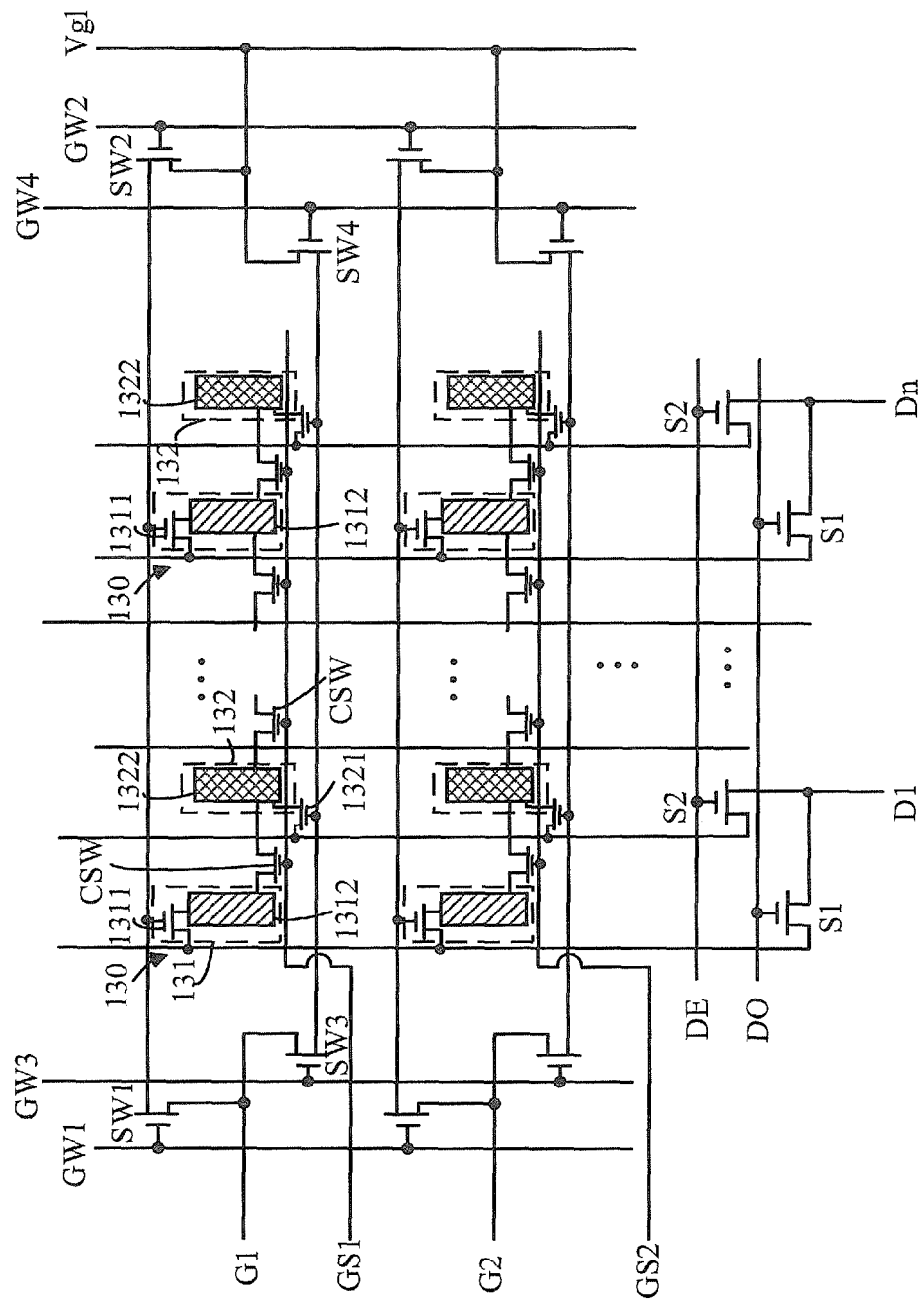
FIG. 2 is a diagram of an enlarged section of the LCD panel in FIG. 1.

Please refer to FIG. 2, a diagram of an enlarged section of the LCD panel 110 in FIG. 1. The plurality of pixel units 130 on the LCD panel 110 are one-to-one electrically connected to data lines D1~Dn and scan lines G1-Gm. Every pixel unit 130 comprises a first sub-pixel 131 and a second sub-pixel 132. The first sub-pixel 131 comprises a first transistor 1311 and a first electrode 1312. The second sub-pixel 132 comprises a second transistor 1321 and a second electrode 1322. The LCD 100 also comprises a plurality of switch units and a plurality of data switches. Every row of pixel units 130 is electrically connected to one switch unit, and every column of pixel units 130 is electrically connected to one data switch. Every switch unit comprises a first switch SW1, a second switch SW2, a third switch SW3 and a fourth switch SW4. Every data switch comprises a first data switch S1 and a second data switch S2. As every pixel unit 130 is electrically connected to similar elements, the following embodiment takes one pixel unit 130 as instance.

Figure 3:
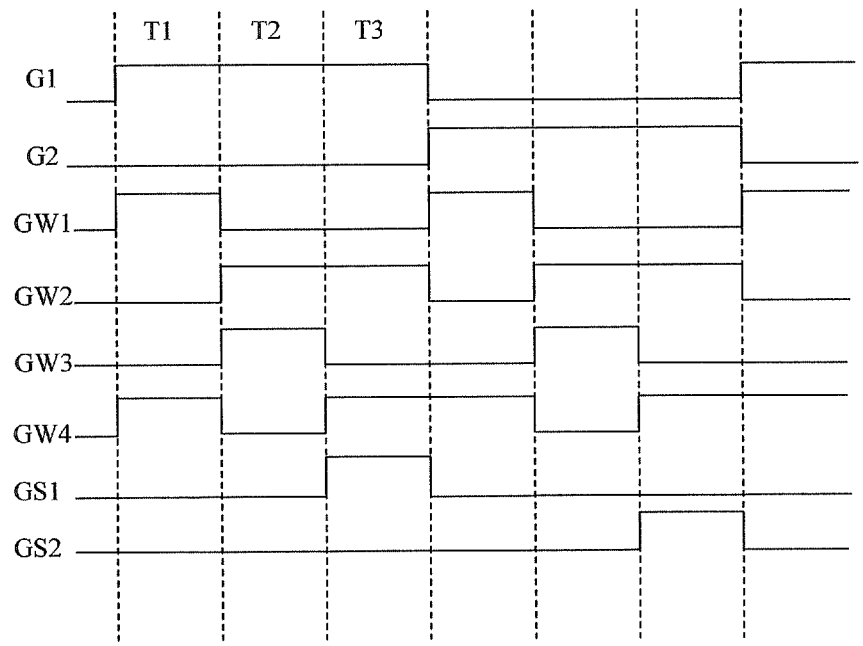
FIG. 3 is a timing diagram of controlling signal GW1-GW4 and charge sharing signal GS1-GS2 which are indicated in FIG. 2 under 2D mode.

Please refer to FIG. 2 and FIG. 3. FIG. 3 is a timing diagram of controlling signal GW1-GW4 and charge sharing signal GS1-GS2 which are indicated in FIG. 2 under 2D mode. The first data switch S1 is electrically connected to the data line D1 and the first sub-pixel 131 to conduct data signal from the data line D1 to the first sub-pixel 131 when receiving the first data controlling signal DO. The second data switch S2 is electrically connected to the data line D1 and the second sub-pixel 132 to conduct data signal from the data line D1 to the second sub-pixel 132 when receiving the second data controlling signal DE. The first switch unit SW1 is electrically connected to the scan line G1 and the first sub-pixel 131 to conduct scan signal from the scan line G1 to the first sub-pixel 131 when receiving the first controlling signal GW1. The second switch unit SW2 is electrically connected to a constant voltage Vg1 and the first sub-pixel 131 to conduct constant voltage Vg1 to the first sub-pixel 131 when receiving the second controlling signal GW2. The third switch unit SW3 is electrically connected to the scan line G1 and the second sub-pixel 132 to conduct scan signal to the second sub-pixel 132 when receiving the third controlling signal GW3. The fourth switch unit SW4 is electrically connected to a constant voltage Vg1 and the second sub-pixel 132 to conduct constant voltage Vg1 to the second sub-pixel 132 when receiving the fourth controlling signal GW4. The plurality of charge sharing switches CSW are electrically connected to the charge sharing source GS1, the first sub-pixel 131 and the second sub-pixel 132 and electrically connects the first sub-pixel 131 to the second sub-pixel 132 when receiving charge sharing signal and are turned on. Preferably, the constant voltage Vg1 must be at low level and incapable of turning on the charge sharing switches CSW. The switch units SW1-SW6, the charge sharing switches CSW and the data switches S1 and S2 are N-type metal oxide semiconductor (NMOS) transistors or P-type metal oxide semiconductor (PMOS) transistors.

When users keep the LCD 100 under 2D mode by input command through the input interface 116, the processing unit 102 initiates signal according to 2D images generated by that command, meanwhile the timing controller 112, the controlling signal generator 114 and the data controlling signal generator 119 provide 2D images with relevant signals. The scan lines G1~Gn send scan signals to every row of pixel units 130 in sequence, the process of which comprises a first period of time T1, a second period of time T2, and a third period of time T3. The first period of time T1, the second period of time T2, and the third period of time T3 are successive. When frame rate of the LCD 100 is 60 Hz, the sum of the first period of time T1, the second period of time T2, and the third period of time T3 is 8.3 ms (1/60).

Take the first scan line G1 as instance. In the first period of time T1, the first data controlling signal DO, the first controlling signal GW1 and the fourth controlling signal GW4 are at high level. The second data controlling signal DE, the second controlling signal GW2, the third controlling signal GW3 and the charge sharing signal GS1 are at low level. Then the first data switch S1, the first switch unit SW1 and the fourth switch unit SW4 are turned on, meanwhile the second data switch S2, the second switch unit SW2, the third switch unit SW3, the fifth switch unit SW5 and the plurality of charge sharing units CSW are turned off. In this moment, the first sub-pixel 131 displays grey level based on the grey level signal generated by the source driver 106.

In the second period of time T2, the second data controlling signal DE, the second controlling signal GW2 and the third controlling signal GW3 are at high level. The first data controlling signal DO, the first controlling signal GW1, the fourth controlling signal GW4 and the charge sharing signal GS1 are at low level. Then the second data switch S2, the second switch unit SW2 and the third switch unit SW3 are turned on, meanwhile the first data switch S1, the first switch unit SW1, the fourth switch unit SW4 and the plurality of charge sharing units CSW are turned off. In this moment, the second sub-pixel 132 displays grey level based on the grey level signal generated by the source driver 106.

In the third period of time T3, the second controlling signal GW2, the fourth controlling signal GW4 and the charge sharing signal GS1 are at high level. The first controlling signal GW1 and the third controlling signal GW3 are at low level. Then the second switch unit SW2, the fourth switch unit SW4 and the plurality of charge sharing switches CSW are turned on. The first switch unit SW1 and the third switch unit SW3 are turned off. The source driver 106 does not send grey level signal to the data line D1, however the first pixel electrode and the second electrode are at the same level and hence share charge due to turning on of the plurality of charge sharing switches CSW.

Figure 4:
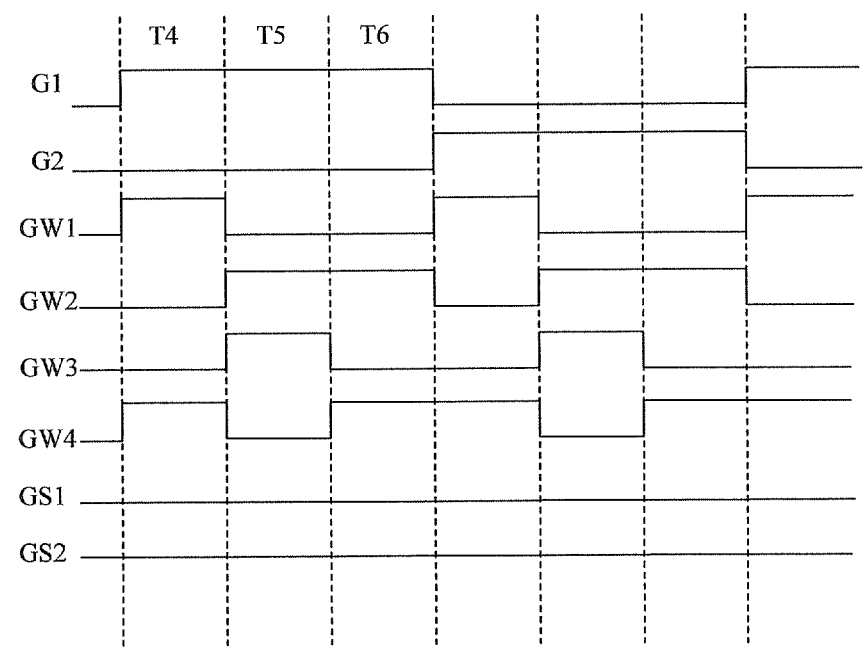
FIG. 4 is a timing diagram of the controlling signals GW1~GW4 and the charge sharing signals GS1~GS2 under 3D mode of FIG. 2.

Please refer to FIG. 2 and FIG. 4. FIG. 4 is a timing diagram of the controlling signals GW1~GW4 and the charge sharing signals GS1~GS2 under 3D mode of FIG. 2. When users keep the LCD 100 under 3D mode by input command through the input interface 116, the processing unit 102 controls the timing controller 112, the controlling signal generator 114 and the data controlling signal generator 119 to provide relevant signals of 3D image in response to a 3D image enabling signal generated by input command. The scan lines G1~Gn send scan signals to every row of pixel units 130 in sequence, the process of which comprises a fourth period of time T4, a fifth period of time T5, and a sixth period of time T6. The fourth period of time T4, the fifth period of time T5, and the sixth period of time T6 are successive.

In the fourth period of time T4, the first data controlling signal DO, the first controlling signal GW1 and the fourth controlling signal GW4 are at high level. The second data controlling signal DE, the second controlling signal GW2, the third controlling signal GW3 and the charge sharing signal GS1 are at low level. Then the first data switch S1, the first switch unit SW1 and the fourth switch unit SW4 are turned on, meanwhile the second data switch S2, the second switch unit SW2, the third switch unit SW3, the fifth switch unit SW5 and the plurality of charge sharing units CSW are turned off. In this moment, the first sub-pixel 131 displays grey level based on the grey level signal generated by the source driver 106.

In the fifth period of time T5, the second data controlling signal DE, the second controlling signal GW2 and the third controlling signal GW3 are at high level. The first data controlling signal DO, the first controlling signal GW1, the fourth controlling signal GW4 and the charge sharing signal GS1 are at low level. Then the second data switch S2, the second switch unit SW2 and the third switch unit SW3 are turned on, meanwhile the first data switch S1, the first switch unit SW1, the fourth switch unit SW4 and the plurality of charge sharing units CSW are turned off. In this moment, the second sub-pixel 132 displays grey level based on the grey level signal generated by the source driver 106.

In the sixth period of time T6, the second controlling signal GW2 and the fourth controlling signal GW4 are at high level. The first controlling signal GW1, the third controlling signal GW3 and the charge sharing signal GS1 are at low level. Then the second switch unit SW2, and the fourth switch unit SW4 are turned on. The first switch unit SW1, the third switch unit SW3 and the plurality of charge sharing switches CSW are turned off. The source driver 106 does not send grey level signal to the data line D1. Because the LCD 100 does not initiate charge sharing under 3D mode, the charge sharing signal GS1~GSm is continuously at low level under 3D mode, resulting in continuous turning off of the plurality of charge sharing switches CSW.

In sum, the LCD 100 in the present invention adds a plurality of switch units to every row of scan line while no additional gate driver is added. The plurality of switch units separately control charging and charge sharing of pixel units, therefore pixel charging and charge sharing are separately controlled. Hence the present invention fixes flicker in 3D image display while no additional gate driver is added.

Figure 5:
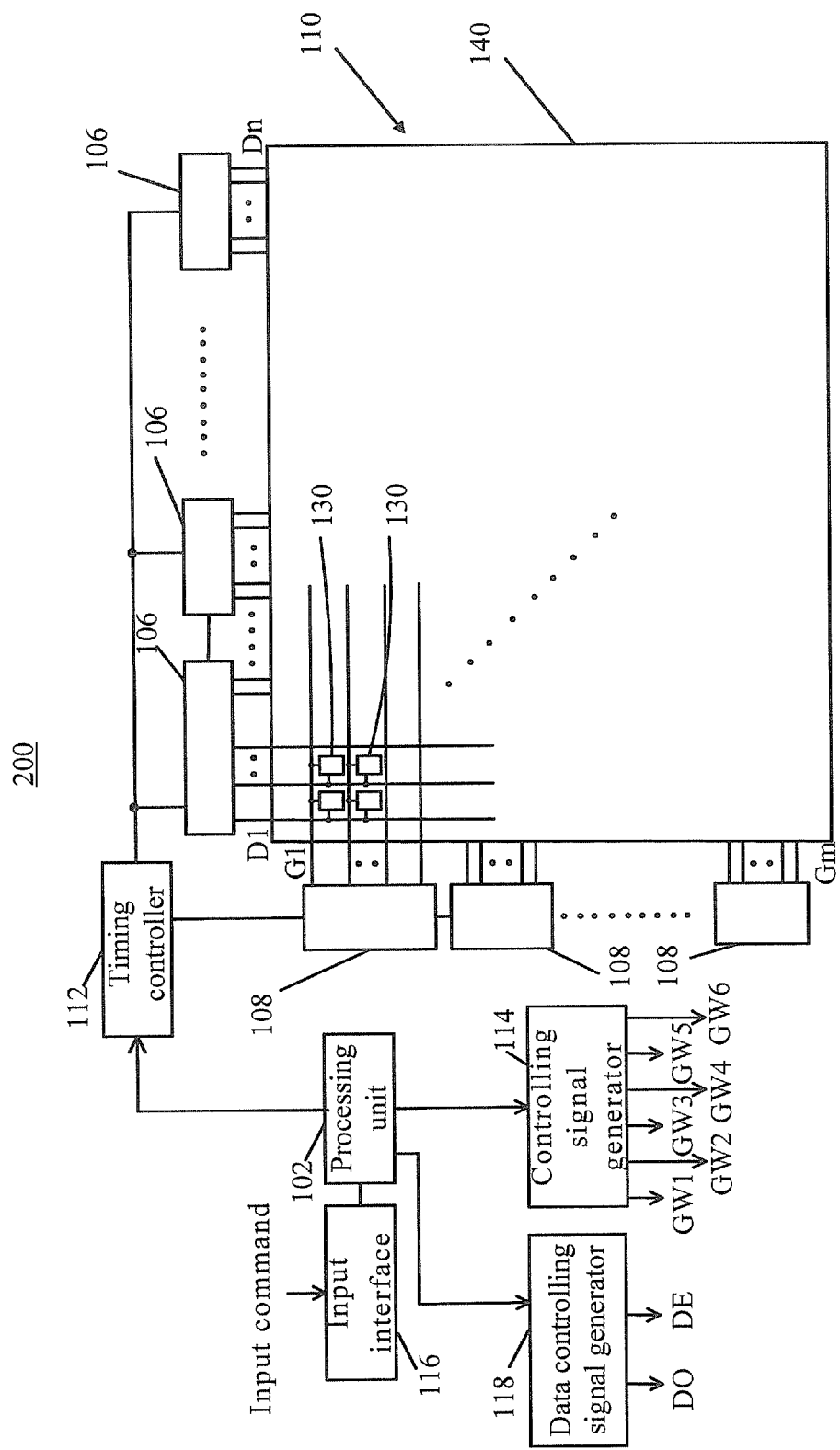
FIG. 5 shows a schematic diagram of an LCD capable of showing 3D images according to a second embodiment of the present invention.

Please refer to FIG. 5. FIG. 5 shows a schematic diagram of an LCD 200 capable of showing 3D images according to a second embodiment of the present invention. The LCD 200 is a 2D/3D switchable LCD. Differing from LCD 100, the LCD 200 comprises a controlling signal generator 114 for generating different controlling signals GW1-GW6 according to 2D/3D enabling signal.

Figure 6:
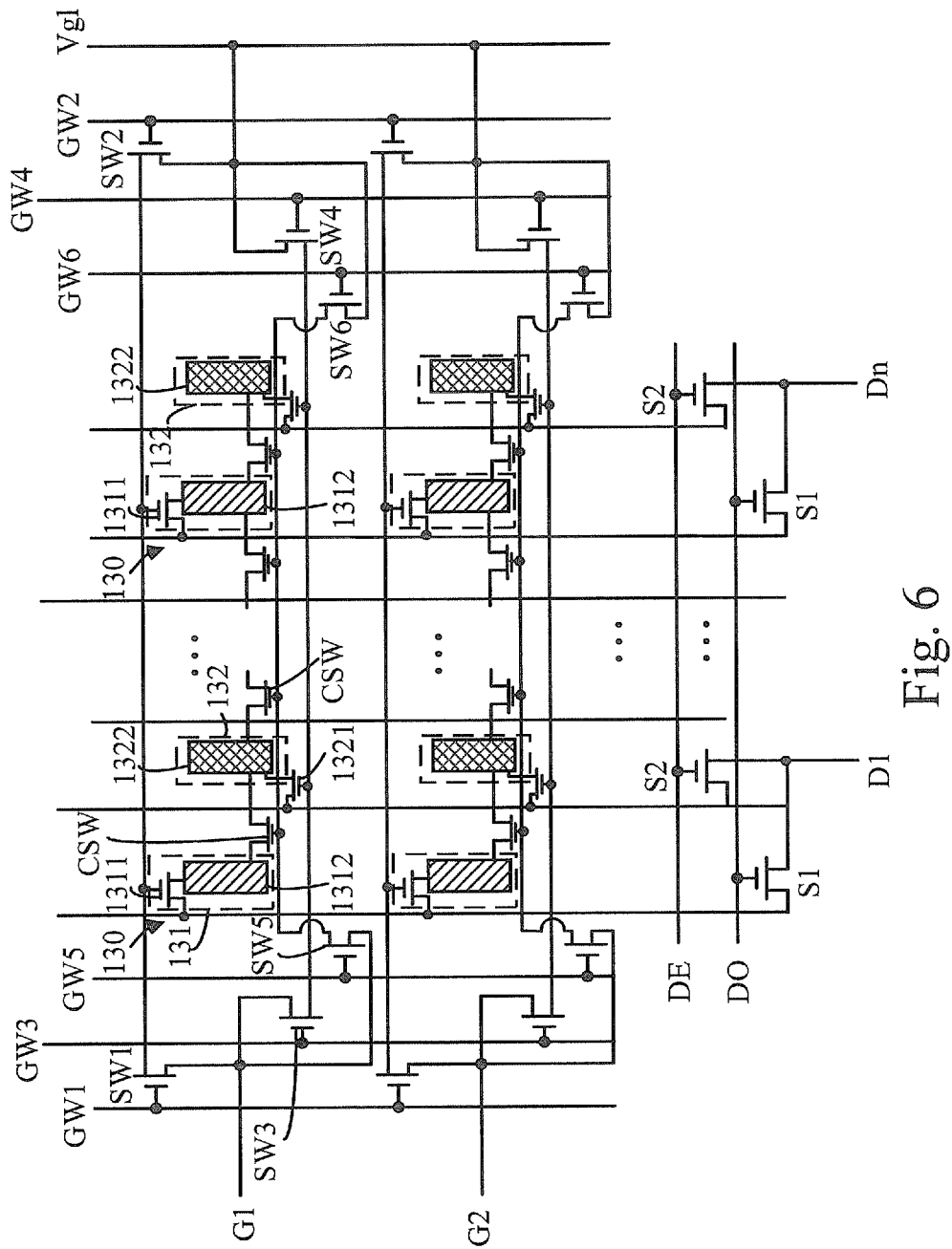
FIG. 6 is a diagram of an enlarged section of the LCD panel in FIG. 5.

Please refer to FIG. 6, a diagram of an enlarged section of the LCD panel 110 in FIG. 5. The plurality of pixel units 130 on the LCD panel 110 are one-to-one electrically connected to data lines D1~Dn and scan lines G1-Gm. Every pixel unit 130 comprises a first sub-pixel 131 and a second sub-pixel 132. The first sub-pixel 131 comprises a first transistor 1311 and a first electrode 1312. The second sub-pixel 132 comprises a second transistor 1321 and a second electrode 1322. The LCD 200 also comprises a plurality of switch units and a plurality of data switches. Every row of pixel units 130 is electrically connected to one switch unit, and every column of pixel units 130 is electrically connected to one data switch. Every switch unit comprises a first switch SW1, a second switch SW2, a third switch SW3, a fourth switch SW4, and a fifth switch SW5, and a sixth switch SW6. Every data switch comprises a first data switch S1 and a second data switch S2. As every pixel unit 130 is electrically connected to similar elements, the following embodiment takes one pixel unit 130 as instance.

Figure 7:
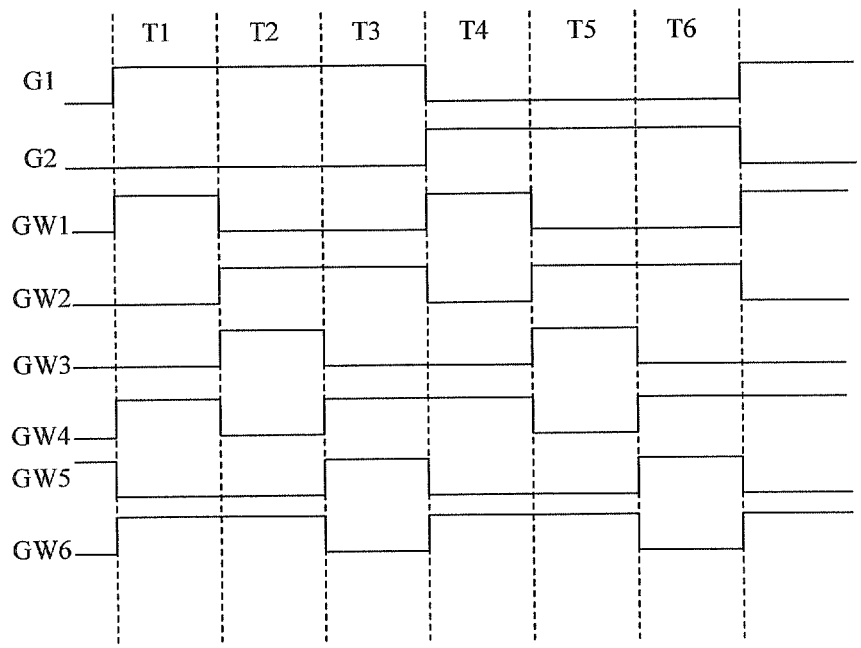
FIG. 7 is a timing diagram of the controlling signals GW1~GW6 under 2D mode of FIG. 6.

Please refer to FIG. 6 and FIG. 7. FIG. 7 is a timing diagram of controlling signals GW1-GW6 and charge sharing signal GS1-GS2 which are indicated in FIG. 6 under 2D mode. The first data switch S1, electrically connected to the data line D1, is used for conducting data signal from the data line D1 to the first sub-pixel 131 when receiving the first data controlling signal DO. The second data switch S2, electrically connected to the data line D1 and the second sub-pixel 132, is used for conducting data signal from the data line D1 to the second sub-pixel 132 when receiving the second data controlling signal DE. The first switch unit SW1, electrically connected to the scan line G1 and the first sub-pixel 131, is used for conducting scan signal from the scan line G1 to the first sub-pixel 131 when receiving the first controlling signal GW1. The second switch unit SW2, electrically connected to a constant voltage Vg1 and the first sub-pixel 131, is used for conducting constant voltage Vg1 to the first sub-pixel 131 when receiving the second controlling signal GW2. The third switch unit SW3, electrically connected to the scan line G1 and the second sub-pixel 132, is used for conducting scan signal to the second sub-pixel 132 when receiving the third controlling signal GW3. The fourth switch unit SW4, electrically connected to a constant voltage Vg1 and the second sub-pixel 132, is used for conducting constant voltage Vg1 to the second sub-pixel 132 when receiving the fourth controlling signal GW4. The fifth switch unit SW5, electrically connected to the scan line G1 and a plurality of charge sharing switches CSW, is used for conducting scan signal to turn on the charge sharing switches CSW when receiving the fifth controlling signal GW5. The sixth switch unit SW6, electrically connected to the constant voltage Vg1 and the plurality of charge sharing switches CSW, is used for conducting the constant voltage Vg1 to turn off the charge sharing switches CSW when receiving the sixth controlling signal GW6. Preferably, a magnitude of the constant voltage Vg1 must be at low level and incapable of turning on the charge sharing switches CSW. The switch units SW1-SW6, the charge sharing switches CSW and the data switches S1 and S2 are N-type metal oxide semiconductor (NMOS) transistors or P-type metal oxide semiconductor (PMOS) transistors.

When users keep the LCD 200 under 2D mode by input command through the input interface 116, the processing unit 102 initiates signal according to 2D images generated by that command, meanwhile the timing controller 112, the controlling signal generator 114 and the data controlling signal generator 119 provide 2D images with relevant signals. The scan lines G1~Gn send scan signals to every row of pixel units 130 in sequence, the process of which comprises a first period of time T1, a second period of time T2, and a third period of time T3. The first period of time T1, the second period of time T2, and the third period of time T3 are successive. When frame rate of the LCD 200 is 60 Hz, the sum of the first period of time T1, the second period of time T2, and the third period of time T3 is about 8.3 (1/60) ms.

Take the first scan line G1 as instance. In the first period of time T1, the first data controlling signal DO, the first controlling signal GW1, the fourth controlling signal GW4, and the sixth controlling signal GW6 are at high level. The second data controlling signal DE, the second controlling signal GW2, the third controlling signal GW3 and the fifth controlling signal GW5 are at low level. Then the first data switch S1, the first switch unit SW1, the fourth switch unit SW4, and the sixth switch unit SW6 are turned on, meanwhile the second data switch S2, the second switch unit SW2, the third switch unit SW3, the fifth switch unit SW5 and the plurality of charge sharing units CSW are turned off. In this moment, the first sub-pixel 131 displays grey level based on the grey level signal generated by the source driver 106.

In the second period of time T2, the second data controlling signal DE, the second controlling signal GW2, the third controlling signal GW3, and the sixth controlling signal GW6 are at high level. The first data controlling signal DO, the first controlling signal GW1, the fourth controlling signal GW4, and the fifth controlling signal GW5 are at low level. Then the second data switch S2, the second switch unit SW2, the third switch unit SW3, the sixth switch unit SW6 are turned on, meanwhile the first data switch S1, the first switch unit SW1, the fourth switch unit SW4, the fifth switch units SW5, and the plurality of charge sharing units CSW are turned off. In this moment, the second sub-pixel 132 displays grey level based on the grey level signal generated by the source driver 106.

In the third period of time T3, the second controlling signal GW2, the fourth controlling signal GW4 and the fifth controlling signal GW5 are at high level. The first controlling signal GW1, the third controlling signal GW3, and the sixth controlling signal GW6 are at low level. Then the second switch unit SW2, the fourth switch unit SW4, and the fifth switch unit SW5 are turned on. The first switch unit SW1, the third switch unit SW3, and the sixth switch SW6 are turned off. The source driver 106 does not send grey level signal to the data line D1, however the fifth switch SW5 conducts the scan signal to turn on the plurality of charge sharing switches CSW. Since the plurality of charge sharing switches CSW are turned on to electrically connect the first pixel electrode and the second electrode, the first pixel electrode and the second electrode are at the same level to realizing share charge.

Figure 8:
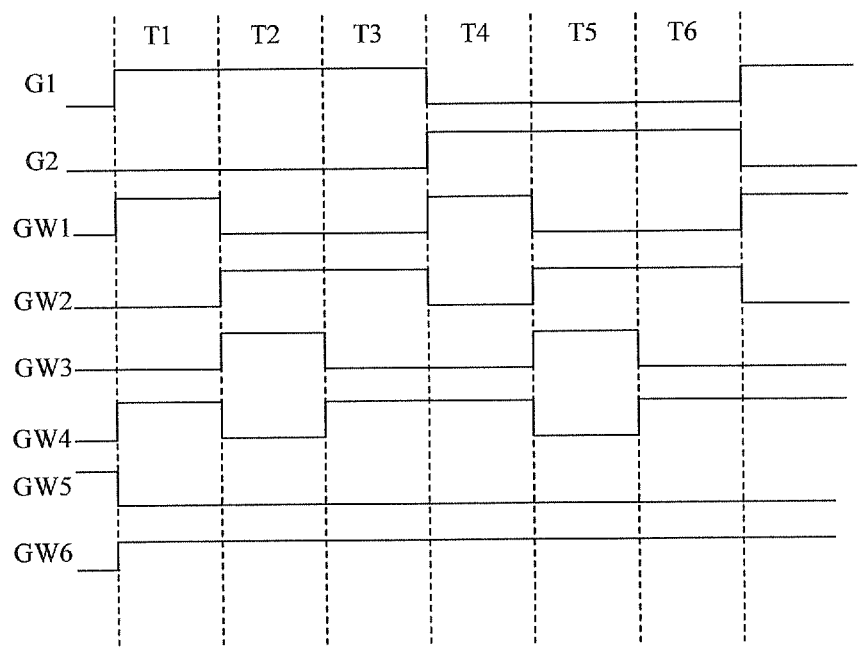
FIG. 8 is a timing diagram of the controlling signals GW1~GW6 under 3D mode of FIG. 6.

Please refer to FIG. 8. FIG. 8 is a timing diagram of the controlling signals GW1~GW6 under 3D mode of FIG. 6. When users keep the LCD 200 under 3D mode by input command through the input interface 116, the processing unit 102 controls the timing controller 112, the controlling signal generator 114 and the data controlling signal generator 119 to provide relevant signals of 3D image in response to a 3D image enabling signal generated by input command. The scan lines G1~Gn send scan signals to every row of pixel units 130 in sequence, the process of which comprises a fourth period of time T4, a fifth period of time T5, and a sixth period of time T6. The fourth period of time T4, the fifth period of time T5, and the sixth period of time T6 are successive.

In the fourth period of time T4, the first data controlling signal DO, the first controlling signal GW1, the fourth controlling signal GW4, and the sixth controlling signal GW6 are at high level. The second data controlling signal DE, the second controlling signal GW2, the third controlling signal GW3 and the fifth controlling signal GW5 are at low level. Then the first data switch S1, the first switch unit SW1, the fourth switch unit SW4, and the sixth switch unit SW6 are turned on, meanwhile the second data switch S2, the second switch unit SW2, the third switch unit SW3, the fifth switch unit SW5 and the plurality of charge sharing units CSW are turned off. In this moment, the first sub-pixel 131 displays grey level based on the grey level signal generated by the source driver 106.

In the fifth period of time T5, the second data controlling signal DE, the second controlling signal GW2, the third controlling signal GW3, and the sixth controlling signal GW6 are at high level. The first data controlling signal DO, the first controlling signal GW1, the fourth controlling signal GW4 and the fifth controlling signal GW5 are at low level. Then the second data switch S2, the second switch unit SW2, the third switch unit SW3, and the sixth switch unit SW6 are turned on, meanwhile the first data switch S1, the first switch unit SW1, the fourth switch unit SW4 and the plurality of charge sharing units CSW are turned off. In this moment, the second sub-pixel 132 displays grey level based on the grey level signal generated by the source driver 106.

In the sixth period of time T6, the second controlling signal GW2, the fourth controlling signal GW4, and the sixth controlling signal GW6 are at high level. The first controlling signal GW1, the third controlling signal GW3 and the fifth controlling signal GW5 are at low level. Then the second switch unit SW2, the fourth switch unit SW4, and the sixth switch unit SW6 are turned on. The first switch unit SW1, the third switch unit SW3 and the fifth switch unit SW5 are turned off. The source driver 106 does not send grey level signal to the data line D1. Because the LCD 200 does not initiate charge sharing under 3D mode, the sixth switch unit SW6 keeps conducting the constant voltage Vg1 under 3D mode, resulting in continuous turning off of the plurality of charge sharing switches CSW.

In sum, the LCD 200 in the present invention adds a plurality of switch units to every row of scan line while no additional gate driver is added. The plurality of switch units separately control charging and charge sharing of pixel units, therefore pixel charging and charge sharing are separately controlled. Hence the present invention fixes flicker in 3D image display while no additional gate driver is added.

The embodiments merely takes NMOS transistors as instance. However, a person having ordinary skill in the art is capable of using PMOS in lieu of NMOS.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display (LCD) fixing flicker in 3D image display, comprising:
    a scan line for sending a scan signal;
    a data line for sending a grey level signal;
    pixel units comprising a first sub-pixel and a second sub-pixel;
    a data controlling signal generator for generating a first data controlling signal and a second data controlling signal;
    a controlling signal generator for generating a first controlling signal, a second controlling signal, a third controlling signal and a fourth controlling signal;
    a charge sharing signal source for generating a charge sharing signal;
    a first data switch, electrically connected to the data line and the first sub-pixel, for conducting the grey level signal to the first sub-pixel when receiving the first data controlling signal;
    a second data switch, electrically connected to the data line and the second sub-pixel, for conducting the grey level signal to the second sub-pixel when receiving the second data controlling signal;
    a first switch unit, electrically connected to the scan line and the first sub-pixel, for conducting the scan signal to the first sub-pixel when receiving the first controlling signal;
    a second switch unit, electrically connected to a constant voltage and the first sub-pixel, for conducting the constant voltage to the first sub-pixel when receiving the second controlling signal;
    a third switch unit, electrically connected to the scan line and the second sub-pixel, for conducting the scan signal to the second sub-pixel when receiving the third controlling signal;
    a fourth switch unit, electrically connected to the constant voltage and the second sub-pixel, for conducting the constant voltage to the second sub-pixel when receiving the fourth controlling signal; and
    a charge sharing switch, electrically connected to the charge sharing signal source, the first sub-pixel and the second sub-pixel, for electrically connecting the first sub-pixel to the second sub-pixel when receiving the charge sharing signal and turning on,
    wherein a process of the scan line sending the scan signal to the pixel units comprises a first period of time, a second period of time and a third period of time when the LCD is under 2D image mode;
    during the first period of time, the first data switch, the first switch unit and the fourth switch unit are turned on while the second data switch, the second switch unit, the third switch unit and the charge sharing switch are turned off, resulting in the first sub-pixel displaying grey level according to the grey level signal;
    during the second period of time, the second data switch, the second switch unit and the third switch unit are turned on while the first data switch, the first switch unit, the fourth switch unit and the charge sharing switch are turned off, resulting in the second sub-pixel displaying grey level according to the grey level signal; and
    during the third period of time, the second switch unit, the fourth switch unit and the charge sharing switch are turned on while the first switch unit and the third switch unit are turned off, resulting in the first sub-pixel electrically connecting to the second sub-pixel.

2. The LCD of claim 1, wherein the first period of time, the second period of time and the third period of time are successive.

3. The LCD of claim 1, wherein the charge sharing signal is the scan signal, the controlling signal is also generating fifth controlling signal and sixth controlling signal, and the LCD further comprises:

a fifth switch unit, electrically connected to the scan line and the charge sharing switch, for conducting the scan signal to turn on the charge sharing switch when receiving the fifth controlling signal;

a sixth switch unit, electrically connected to the constant voltage, for conducting the constant voltage to turn off the charge sharing switch when receiving the sixth controlling signal.

4. The LCD of claim 3, wherein when the LCD is under 2D mode, the fifth switch unit is turned off while the sixth switch unit is turned on to conduct the constant voltage during the first and second periods of time;

the fifth switch unit is turned on to conduct the scan signal while the sixth switch unit is turned off during the third period of time.

5. The LCD of claim 3, wherein when the LCD is under 2D mode, the first controlling signal and the second controlling signal are inversed, the third controlling signal and the fourth controlling signal are inversed, and the fifth controlling signal and the sixth controlling signal are inversed.

6. The LCD of claim 3, wherein when the LCD is under 3D mode, the fifth switch unit and the sixth switch unit are inversed.

7. The LCD of claim 3, wherein a process of the scan line sending the scan signal to the pixel units comprises a fourth period of time and a fifth period of time when the LCD is under 3D image mode;

during the fourth period of time, the first switch unit and the fourth switch unit are turned on while the second switch unit and the third switch unit are turned off, resulting in the first sub-pixel displaying grey level according to the grey level signal; and during the fifth period of time, the second switch unit and the third switch unit are turned on while the first switch unit and the fourth switch unit are turned off, resulting in the second sub-pixel displaying grey level according to the grey level signal.

8. The LCD of claim 7, wherein the fourth period of time and the fifth period of time are successive.

9. The LCD of claim 7, wherein when the LCD is under 3D mode, the first controlling signal and the second controlling signal are inversed, the third controlling signal and the fourth controlling signal are inversed.

\* \* \* \* \*